US007052176B2

(12) United States Patent
Stephan et al.

(10) Patent No.: US 7,052,176 B2
(45) Date of Patent: May 30, 2006

(54) REMOTE TEMPERATURE MEASURING SYSTEM FOR HOSTILE INDUSTRIAL ENVIRONMENTS USING MICROWAVE RADIOMETRY

(75) Inventors: Karl David Stephan, San Marcos, TX (US); John Anthony Pearce, Austin, TX (US)

(73) Assignees: University of Texas System, Austin, TX (US); Texas State University, San Marcos, TX (US)

( * ) Notice: Subject to any disclaimer, the term of this patent is extended or adjusted under 35 U.S.C. 154(b) by 38 days.

(21) Appl. No.: 10/887,701

(22) Filed: Jul. 9, 2004

(65) Prior Publication Data

US 2005/0053118 A1     Mar. 10, 2005

Related U.S. Application Data

(60) Provisional application No. 60/486,309, filed on Jul. 11, 2003.

(51) Int. Cl.
    *G01J 5/00*        (2006.01)
(52) U.S. Cl. ........................... 374/122; 374/128
(58) Field of Classification Search ................. 374/122
See application file for complete search history.

(56) References Cited

U.S. PATENT DOCUMENTS 3,167,714 A * 1/1965 Seling .......................... 250/250
3,325,644 A * 6/1967 Frye et al. ................. 250/338.1
3,564,420 A * 2/1971 Webb .......................... 374/122

(Continued)

FOREIGN PATENT DOCUMENTS

JP      01244321 A * 9/1989

OTHER PUBLICATIONS

B. Bocquet, J. C. Van de Velde, A. Mamouni, and Y. Leroy. "Non Destructive Thermometry By Means Of Microwave Radiometry," Microwave Processing of Materials IV (Materials Research Society Symposium Proceedings vol. 347, Apr. 4-8, 1994), pp. 143-154.

(Continued)

*Primary Examiner*—Diego Gutierrez
*Assistant Examiner*—Mirellys Jagan
(74) *Attorney, Agent, or Firm*—Jerry M. Keys; Robert A. Voigt, Jr.; Winstead Sechrest & Minick P.C.

(57) ABSTRACT

A system and method for remotely measuring the temperature of an object using microwave radiometry that may be used in hostile environments. A single pole-single throw reflective PIN diode switch is operable in a PASS mode and a BLOCK mode. In the PASS mode, the switch passes the power received from the object to a low-noise block converter ("LNB") for amplification. In the BLOCK mode, the switch blocks the object power and reflects the load noise power of an ambient temperature load to the LNB. A detector diode detects the amplified power output during both the BLOCK and PASS mode and the AC signal from the detector is converted to an output signal proportional to the difference in the noise powers detected in the PASS and BLOCK modes. A servo loop uses the output signal to generate a feedback signal to a noise injection diode that causes the diode to inject sufficient power into the LNB to automatically maintain a balance between noise power measured in the PASS mode and the combined noise powers measured in the BLOCK mode. The output signal is then used to compute the temperature of the object.

13 Claims, 8 Drawing Sheets

U.S. PATENT DOCUMENTS

| | | | | |
|---|---|---|---|---|
| 3,777,270 | A * | 12/1973 | Hardy et al. | 342/351 |
| 4,235,107 | A * | 11/1980 | Ludeke et al. | 374/122 |
| 4,568,200 | A * | 2/1986 | Hatono et al. | 374/122 |
| 5,020,920 | A | 6/1991 | Gopalsami et al. | 374/57 |
| 5,176,146 | A * | 1/1993 | Chive et al. | 600/549 |
| 5,341,814 | A * | 8/1994 | Van De Velde et al. | 600/549 |
| 5,688,050 | A * | 11/1997 | Sterzer et al. | 374/122 |
| 6,183,126 | B1 | 2/2001 | Murphy et al. | 374/5 |
| 6,536,948 | B1 | 3/2003 | Vivekanandan et al. | 374/161 |
| 6,834,991 | B1 * | 12/2004 | Roeder | 374/1 |
| 6,964,514 | B1 * | 11/2005 | Land | 374/122 |
| 2003/0026321 | A1 | 2/2003 | Land | 374/129 |
| 2004/0021078 | A1 | 2/2004 | Hagler | 250/339.13 |
| 2005/0190815 | A1 * | 9/2005 | Lee et al. | 374/122 |

OTHER PUBLICATIONS

E. Nyfors and P. Vainkainen. *Industrial Microwave Sensors*. Norwood, MA: Artech House, 1989, pp. 267-289.

N. Skou. *Microwave Radiometer Systems: Design & Analysis*. Norwood, MA: Artech House, 1989, pp. 1-157.

G. S. Woods, C. J. Kikkert, and D.L. Maskell. "Design of a Microwave Radiometer used for Temperature Measurements in Harsh Conditions". Proceedings 1994 Asia-Pacific Microwave Conference, Dec. 6-9, 1994, Tokyo, pp. 473-476.

"Microwave Temperature Sensor," via Internet at http://eng.jcu.edu.au/ece/research/mwtemp/home.html, printed Sep. 28, 2004, 2 pages.

* cited by examiner

REMOTE TEMPERATURE MEASURING SYSTEM FOR HOSTILE INDUSTRIAL ENVIRONMENTS USING MICROWAVE RADIOMETRY

CROSS-REFERENCE TO RELATED APPLICATION

This application is a continuation-in-part of U.S. provisional patent application Ser. No. 60/486,309 filed Jul. 11, 2003, entitled "Remote Temperature Measuring System For Hostile Industrial Environments Using Microwave Radiometry."

FIELD OF INVENTION

The present invention relates in general to the field of microwave radiometry and, more particularly, to a substantially simplified form of a noise-injection type microwave radiometer useful in remotely measuring the temperature of objects in hostile environments.

BACKGROUND OF INVENTION

In many industrial processes which involve heating, the temperature of the material or object(s) undergoing processing is critical to the successful and efficient completion of the process. Accordingly, suitable means are often incorporated in industrial processes to measure temperature. Most of these means (including but not limited to thermocouples, resistance-temperature devices, and so on) require that the measuring instrument be in physical contact with the material whose temperature is to be measured. However, in many situations direct physical contact is either impossible or undesirable. Examples include the processing of paper or plastic sheets where contact will damage the material, processing of caustic or extremely high-temperature materials such as cement where contact with the material will eventually damage the instrument, and the processing of any material on a moving conveyor belt where contact is mechanically difficult to maintain for the time required for a measurement.

It is well known that all objects above 0 degrees Kelvin (0° K.) emit electromagnetic radiation in accordance with Planck's radiation law. At room temperature, the peak intensity of this emission is in the infrared region. Remote measurement of temperature is made possible by this phenomenon through the measurement of the visible or infrared radiation emitted from the material whose temperature is to be measured. Relatively simple and inexpensive commercial instruments for remote measurement of temperature have been developed for this purpose. Virtually all of these instruments use infrared or visible radiation in the wavelength range of 10 microns or shorter.

While such infrared and visible-light remote-temperature measurement devices work well in many applications, there remain a number of industrial circumstances in which these instruments will not work. There are at least three reasons for this. (1) The heating process or related processes produce airborne particulates, condensing vapor, smoke, or other suspended substances which scatter infrared and light rays. (2) The material is being heated with microwave or RF power, often inside a shielded enclosure, and the resulting electromagnetic fields and requisite metallic shielding interfere with the proper operation of the sensor. (3) Because of the nature of the process, the temperature beneath the surface of the material is desired, but infrared and visible-light sensors sense the temperature of most solid objects using only radiation from the surface and a few microns beneath the surface. Because of these and other shortcomings, remote temperature sensing in industrial applications using infrared or visible-light technology cannot be used in a number of situations that could benefit from it.

This invention reduces or eliminates all the above-mentioned problems associated with infrared and visible-light measurement of temperature in the following ways. Because of its longer wavelength, microwave radiation is scattered much less than infrared radiation, so that suspended particles which prevent infrared sensors from operating will present little or no difficulty for microwave remote temperature sensors. A microwave remote temperature sensor can be designed not only to be impervious to the influence of (periodically interrupted) microwave or RF radiation, but can actually take advantage of a shielded enclosure to improve the overall accuracy of the measurement. Depending on the wavelength chosen and the dielectric properties of the object observed, microwave remote sensing of temperature can reveal temperature information from regions as deep as several cm beneath the surface of an object or material.

These advantages derive from the present invention applying these fundamental physical principles in novel ways by using features which make it economical, stable, and reliable, as well as capable of measuring the temperature of objects and materials which at present can either not be measured at all or measured only with great difficulty and expense.

Microwave radiometry has been practiced for scientific and military purposes since before 1945. However, until solid-state devices such as the gallium-arsenide MESFET were recently developed, microwave radiometers were expensive, bulky systems. Recently with the development of high-volume consumer applications of low-noise microwave amplifiers, it is possible to manufacture subsystems such as low-noise block converters (LNBs) that sell for less than $50 US retail.

Experiments with microwave radiometry for industrial applications have been published by several commentators. These researchers have reported the microwave temperature measurement of road asphalt and cement in a kiln. It appears that because of the expense and inconvenience of the equipment used in these experiments, none of the reported radiometers have become available commercially, although some microwave radiometers have been used in laboratory settings for medical purposes.

The typical research-quality microwave radiometer is a complex system consisting of dozens of high-cost microwave components and an equally complex set of low-frequency analog and digital electronics. For reasons of stability, the entire microwave portion of the system is often installed inside an insulated box that is maintained at a constant temperature. One commentator has described several microwave radiometer configurations that have proved to be practical for such scientific uses. These include the simplest "total-power" type and the more sophisticated "Dicke" and "noise-injection" types. The "total-power" type of radiometer is insufficiently stable for industrial use, and the other two types are typically too complex for industrial use. For example, one known noise-injection radiometer uses at least the following microwave components: (1) directional coupler, (2) absorptive PIN-diode switch, (3) noise diode, (4) thermally stabilized reference-temperature load, (5) latching switchable circulator, (6) isolator, (7) LNB and (8) detector.

To address the limitations in the art as described above, there is a need for a substantially simplified form of microwave radiometer that is substantially impervious to changes in system gain or detector characteristics. There is also a need for a radiometer that operates accurately without the need for a temperature-controlled enclosure. A further need is a radiometer with fewer parts.

SUMMARY OF INVENTION

Briefly the present invention provides a new and improved system, and a method of, remotely measuring the temperature of an object using microwave radiometry that may be used in hostile environments. The system may comprise a single pole-single throw microwave switch that receives microwave power from the object which is operable in a PASS mode and a BLOCK mode, a load that generates noise power reflective of the ambient temperatures and a microwave amplifier for amplifying the power the system receives. In the PASS mode, the switch passes the power received from the object to the microwave amplifier. In the BLOCK mode, the switch blocks the object power to the amplifier and reflects the load noise power to the amplifier. A microwave detector detects the amplifier output during both the PASS and BLOCK modes. The signal from the microwave detector is then used to generate an output signal proportional to the difference in the noise powers detected in the PASS and BLOCK modes. The system also includes a noise injection source that injects additional noise power into the microwave amplifier during the BLOCK mode in response to a feedback signal generated by a servo loop, in response to the output signal, to automatically maintain a balance between the noise power measured in the PASS mode and the combination of noise powers measured in the BLOCK mode. The output signal is then used to compute the temperature of the object.

In one embodiment of the present invention, the switch passes the power received from the object through a circulator and directional coupler in the PASS mode. In the BLOCK mode, the noise power of the ambient load passes through the circulator and another arm of the coupler to the amplifier and the noise power from the noise injection source passes through another arm of the coupler.

In another embodiment, the load is an attenuator that also functions as a noise power source reflective of the ambient temperature of the system. In this embodiment, the noise injection source is connected to the attenuator and in the BLOCK mode, the noise power from the injection source is injected through the attenuator and the circulator into the amplifier.

In another embodiment, the system is adapted for remotely measuring the temperature of an object being periodically subjected to electromagnetic radiation by synchronizing the operation of the system to only those periods of time when the object is not being subjected to the periodic electromagnetic fields.

In another embodiment, the servo loop generates and transmits another signal to the injection source during the PASS mode that has a fixed duty cycle to cause the noise-injection source to inject sufficient power into the microwave amplifier during the PASS mode to raise the effective input temperature of the power being received by the microwave amplifier to above the ambient temperature during the PASS mode.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the enclosed Figures, which show various embodiments of a system for remotely measuring the temperature of an object using microwave radiometry. The systems provide a simplified form of the noise-injection type of microwave radiometer that are substantially impervious to changes in system gain or detector characteristics and that can operate accurately within needing to be enclosed within a temperature controlled enclosure, thereby permitting their use in hostile environments.

The purpose of a microwave radiometer is to produce an output (either analog or digital) which is proportional to the "noise temperature" of the microwave source connected to its input. The noise temperature of a source or object is the temperature of an ideal black-body radiator which would produce the same microwave noise power in a given bandwidth in a single-mode transmission line, as the actual source under examination. Ideally, the radiometer would add no noise of its own, but all practical radiometers contribute some internal noise. This internal noise is also referred to by an equivalent temperature in degrees K. Modern solid-state microwave amplifiers can achieve internal noise temperatures lower than 100° K., while operating physically at room temperature (approximately 293° K. or 20° C.). The present invention uses a commercial LNB whose internal noise temperature is approximately 120° K. although other types of devices providing the same functionally may be used. For example, the functions performed by the LNB can instead be included in a custom-designed microwave circuit employing the principles to be described.

First Embodiment

Figure 1:
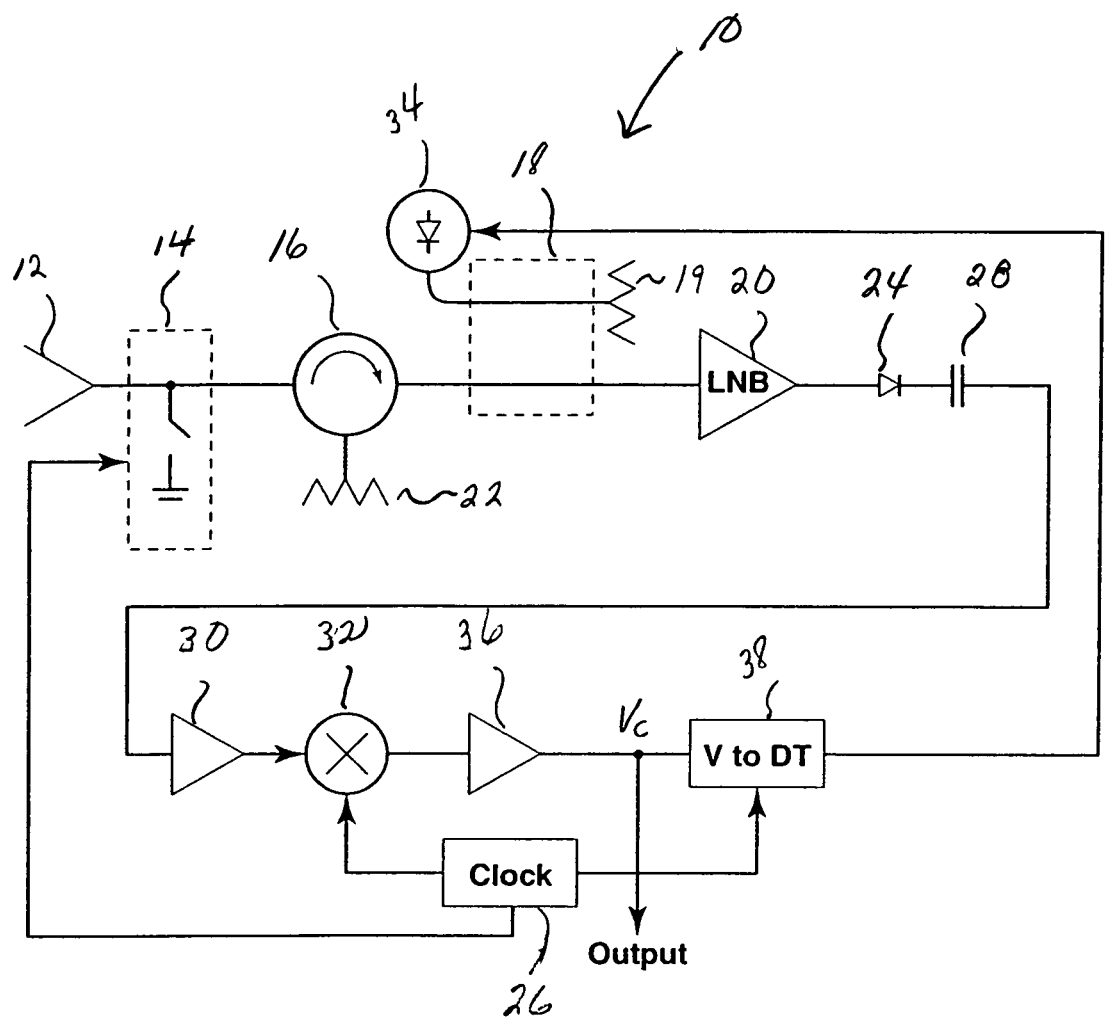
FIG. 1 is a block diagram of a first embodiment of the remote temperature measuring system using microwave radiometry of the present invention.

A first embodiment 10 of remote temperature measuring system using microwave radiometry (or microwave radiometer) of the present invention is shown in FIG. 1. A low-loss antenna 12 (such as a waveguide horn or other waveguide antenna) receives the microwave power radiated in a bandwidth B (Hz) from the object (not shown) whose temperature is to be measured. In the present embodiment, the bandwidth extends from approximately 12 GHz to approximately 13 GHz, but other microwave frequencies and bandwidths can be used. A low-loss single pole-single throw microwave switch 14 alternately allows the incoming microwave energy from the antenna 12 to pass on to the rest of the system, (the PASS mode) or blocks it and becomes a highly reflective circuit element (the BLOCK mode). In the PASS mode, the switch 14 permits the incoming energy to pass through the circulator 16, through the main arm of a directional coupler 18 into an LNB 20. In the, first embodiment, the microwave switch 14 is preferably a reflective PIN-diode switch, but other microwave devices capable of low-loss reflective switching such as a microwave field-effect transistor or a microelectromechanical (MEM) switch may be used. Further, other types of conventional microwave amplifiers may be used in lieu of an LNB. The term LNB as used herein is intended therefore to include other microwave amplifiers that perform the same functions. The internal noise temperature of the LNB 20 can be adversely affected if its own internal noise leaves the input to the LNB and is reflected back into the LNB. The circulator (3) prevents this noise inflection by diverting any such noise into a load 22, which is at the ambient temperature $T_{AMB}$ of the system 10 (typically room temperature of approximately 20° C.).

In the PASS mode, the LNB 20 filters and amplifies the incoming power, converts it by means of an internal local oscillator and mixer to a lower frequency (0.9 to 1.9 GHz in the present embodiment), and sends the amplified and down-converted power to an intermediate-frequency (IF) amplifier (internal to the LNB). The microwave power outputted by the LNB 20 is now at a sufficiently high level to be detected by a microwave detector 24, typically a Schottky or other type of microwave diode.

In the BLOCK mode, the microwave switch 14 performs two functions. It blocks the incoming power from the microwave source, and it reflects noise power that emerges from the ambient temperature load 22 into the directional coupler 18 and the LNB 20. In this way, during the PASS mode the LNB 20 amplifies the power from the source to be measured, while during the BLOCK mode the LNB 20 amplifies the noise power from the load 22. For purposes of calibration, the physical temperature of the load 22 can be measured with a small semiconductor temperature-measurement circuit (not shown).

Microwave switch 14 is rapidly switched between the PASS mode and the BLOCK mode in response to a reference signal operating at a frequency $f_S$ generated by a clock 26. In the present embodiment the frequency $f_S$ of this system switching rate is approximately 1 kHz, but other frequencies can be used. The effect of this switching is to cause a square-wave signal at the system switching rate or frequency $f_S$ to appear at the output of the detector 24. The amplitude of this square wave is a measure of the difference between the noise power from the source in the PASS mode and the noise power measured in the BLOCK mode.

This square wave is AC-coupled through a capacitor 28 to an audio-frequency amplifier 30 for amplification. The amplified signal is than outputted to a synchronous detector 32. The synchronous detector's gain is switched between +1 and −1 at a rate in synchronism with the microwave switch switching rate $f_S$ in response to a signal from the clock 26. Thus, the detector 32 generates a DC output voltage proportional to the difference between the noise powers amplified in the PASS mode and in the BLOCK mode.

The present invention incorporates a servo loop which automatically maintains a nearly perfect balance between the noise power measured in the PASS mode and that measured in the BLOCK mode. Since most objects of interest will have a temperature somewhat higher than room temperature, this balance can be maintained by injecting noise into the LNB during the BLOCK mode. This noise adds to the room-temperature noise from the load 22 to equal the noise power coming from the source (not shown) in the PASS mode. The advantage of this noise-balancing feature is that any changes in system gain or detector sensitivity have no effect (to the first order) on the output voltage $V_C$. The accuracy of the system 10 is determined almost exclusively by the accuracy of the injected noise, which can be made very accurate, as described below.

Additional noise is injected into the LNB 20 in the BLOCK mode by means of a noise-injection source 34 connected thereto through another arm of the directional coupler 18.

Referring to the servo loop in more detail, the output voltage from the synchronous-detector 32 is permitted into a servo loop amplifier 36 which incorporates a high-frequency roll off for filtering and stability purposes. Preferably the loop amplifier is an analog resistor-capacitor-amplifier filter, although other embodiments described below may use switched-capacitor filters or all-digital signal processing. The output voltage $V_C$ of the servo loop amplifier is inputted into a voltage-to-dwell-time (V to DT) converter 38. The input voltage $V_C$ from the servo loop amplifier 36 is between a minimum value $V_{MIN}$ and a maximum value $V_{MAX}$. The V to DT converter 38 also receives a high-frequency clock signal from the clock 26, at a Frequency $f_D$ which is an integer multiple of the system switching frequency $f_S$. The V to DT converter 38 is designed to produce an output waveform which switches rapidly between a high voltage $V_D$ and zero at the frequency $f_D$, and whose duty cycle ratio (the percentage of time the voltage is at $V_D$) is directly proportional to the input voltage $V_C$. When $V_C=V_{min}$, the duty cycle is zero, and when $V_C=V_{MAX}$, the duty cycle ratio is 100%. The V to DT converter output drives the noise source 34 directly to cause the injection of additional noise into the LNB during the BLOCK mode.

Preferably, the noise-injection source is a noise-injection diode; however any noise source whose output is capable of being varied in a reliable and predictable manner by a control voltage may be used. Possible alternate noise-injection sources include: (a) an amplifier using field-effect or junction transistors followed by a PIN-diode or other switch or variable attenuation device to vary the amplifier's noise output, (b) a microwave load resistor physically heated to a high temperature followed by a PIN-diode or other switch or variable attenuation device, or whose physical temperature can be varied in a controlled fashion; or (c) a noise source such as a gas-plasma diode (e. g. fluorescent tube) followed by a PIN-diode or other switch or variable attenuation device.

Microwave noise diodes are typically designed to deliver a specified level of noise power when supplied with a specified voltage $V_D$. For voltages other than $V_D$, the output is unpredictable and so the diode noise power cannot be reliably varied with continuous variation of applied voltage. However, when supplied with the rapidly switched waveform from the V to DT converter 38, the noise diode's average equivalent noise temperature can be varied smoothly and linearly from room temperature to a maximum value $T_{DMAX}$. Because of the high frequency of $f_D$ relative to $f_S$, the noise-power modulation at this frequency is filtered away by the lowpass filter incorporated in the servo loop amplifier 36. In the present embodiment, $f_D$=64 KHz, but other frequencies can be used.

In the PASS mode, the LNB 20 amplifies only the noise power from the source whose temperature is to be measured. In the BLOCK mode, the LNB amplifies a combination of (a) the noise power from the load 22 transmitted through the circulator 16 and (b) the average noise power injected from the noise-injection source 34 and coupled into the LNB 20 through the directional coupler 18. Because the directional coupler 18 can have a high degree of coupling loss (20 dB in the first embodiment), it presents very low loss to the incoming source power in the PASS mode, yet couples enough noise power from the noise diode 34 in the BLOCK mode to equal the source power in the PASS mode.

When the servo loop is operating properly, the average noise power injected from the noise diode 34 almost equals the noise power measured from the source. (In this proportional servo loop, the two power levels can be made exactly equal only with infinite loop gain, but sufficient accuracy results from a loop gain of at least 20 dB.) Because the control voltage $V_C$ is proportional to the injected noise power, it is also proportional to the measured input noise power from the source as long as the servo loop functions properly. Therefore, the temperature $T_{SOURCE}$ can be determined by a person of ordinary skill in the art from input temperature $T_A$ at the antenna which can be computed from the control voltage $V_C$ by using conventional circuits or software as set forth below.

In proper operation, the relation between the control voltage $V_C$ and the input temperature at the antenna $T_A$ (all temperatures in degrees Kelvin) is expressed by a linear relation of the form $$T_A = mV_C + b$$

where m and b are constants. In theory, these constants depend on the following quantities which are defined differently for the embodiments shown in FIGS. 1 and 2.

For the embodiment shown in FIG. 1, we define these quantities:

$L_A$ is the power insertion loss ratio (>1) between the antenna (input of the radiometer) and the LNB input, encountered as the input signal passes through the PIN-diode switch 14 in its PASS mode, the circulator 16, and the main arm of the directional coupler 18.

$L_C$ is the power insertion loss ratio (>1) between the noise diode 34 and the LNB input, encountered as the noise generated by the noise diode 34 passes through the coupling loss of the directional coupler 18.

$T_{DMAX}$ is the noise power output (measured in equivalent black-body temperature of degrees K) produced by the noise diode 34 when it is powered ON all the time (100% duty cycle).

$T_{INT}$ is the physical temperature in degrees Kelvin of the radiometer RF system, specifically the temperature of the circulator's load resistor and the directional coupler's load resistor.

A is the fractional duty cycle (expressed as a dimensionless number between 0 and 1) which expresses the fraction of time that power is applied by the V to DT converter 38 to the noise diode 34 during the BLOCK mode.

$A_0$ is the fractional duty cycle (expressed as a dimensionless number between 0 and 1) which expresses the fraction of time that power is applied by the V to DT converter 38 to the noise diode 34 during the PASS mode. This number is a constant chosen to set the minimum-temperature point of the radiometer output range, and is typically in the range of 0.1 to 0.3.

$V_{MAX}$ is the designer-defined maximum output voltage of the radiometer.

$V_{MIN}$ is the designer-defined minimum output voltage of the radiometer.

Figure 2:
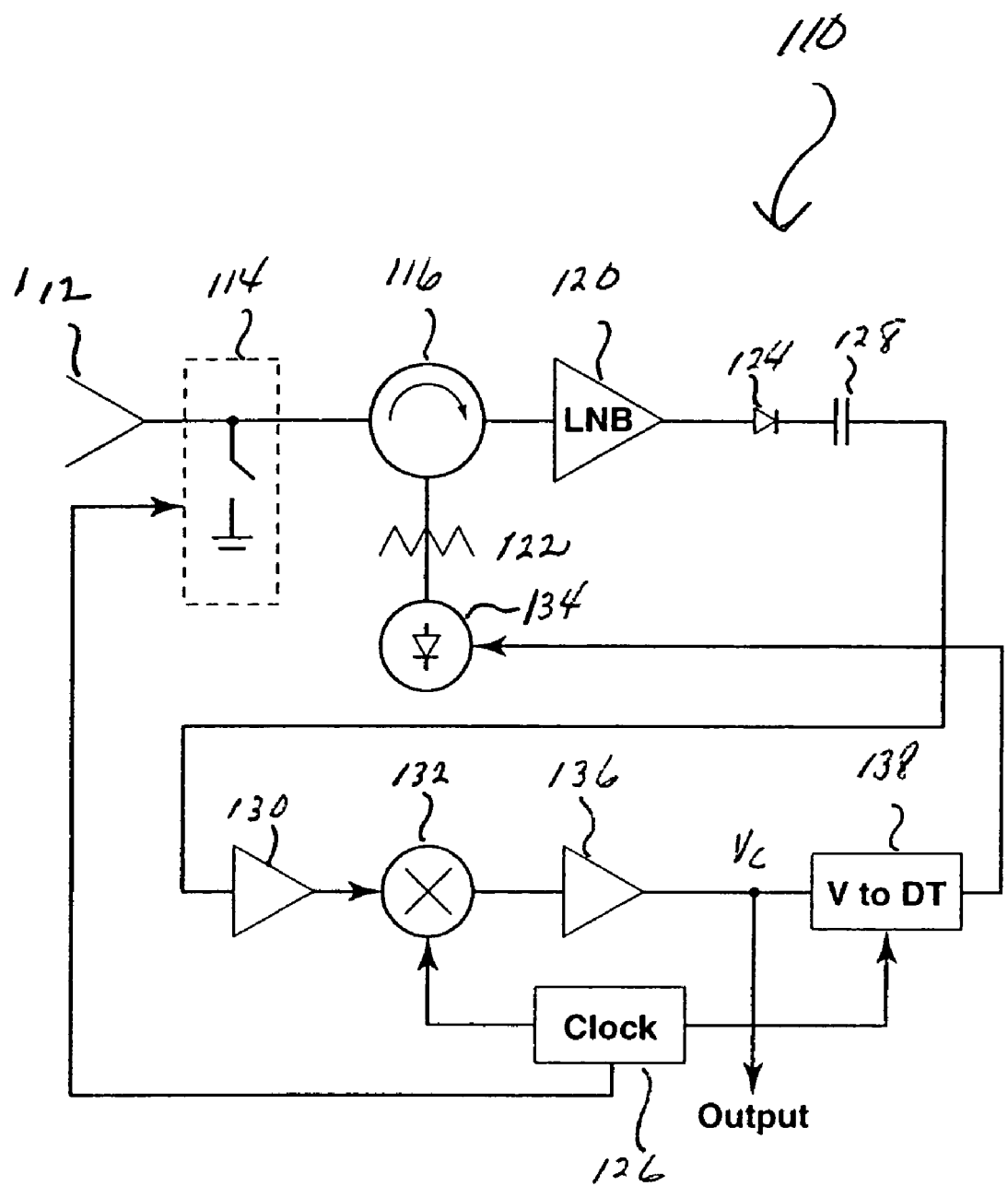
FIG. 2 is a block diagram of a second embodiment of the remote temperature measuring system.

For the embodiment in FIG. 2, the definitions above apply with the following exception:

$L_C$ is the power insertion loss ratio (>1) between the noise diode and the LNB input, encountered as the noise generated by the noise diode passes through the circulator to the PIN-diode reflective switch in its BLOCK mode, is reflected by the switch, passes back through the circulator, and arrives at the LNB input.

The voltage-to-dwell-time converter produces a fractional duty cycle A from the control-voltage input $V_C$ according to the expression $$A = \frac{V_C - V_{MIN}}{V_{MAX} - V_{MIN}}$$

so that as the control voltage varies from $V_{MIN}$ to $V_{MAX}$, the fractional duty cycle A will vary between 0 and 1. When the servo loop is operating, it adjusts $V_C$ so as to make the noise inputs to the LNB approximately equal in the BLOCK mode and in the PASS mode. Equating the expressions for these noise powers in terms of equivalent temperature leads to the following expression for $T_A$ in terms of $V_C$:

$$T_A = \left[\frac{L_A}{L_C} \cdot \frac{(T_{DMAX} - T_{INT})}{(V_{MAX} - V_{MIN})}\right] \cdot V_C + \left[L_A T_{INT} + \frac{L_A}{L_C} \cdot (T_{DMAX} - T_{INT})\left(\frac{-V_{MIN}}{V_{MAX} - V_{MIN}} - A_0\right)\right]$$

The first term in square brackets equals m and the second term equals b in the equation $T_A = MV_C + b$. This equation can be used for design purposes and shows that with a non-zero $A_0$, the instrument can measure input temperatures $T_A$ that are below the instrument's internal temperature $T_{INT}$. Also, the maximum measurable temperature can be adjusted easily by changing the value of loss $L_C$ (by means of insertion of a passive attenuator, for example).

In practice, variations in loss, reflections, etc. make the actual radiometer response slightly different than what is predicted by the equation above. For this reason, a one-time calibration can be performed by presenting two known microwave temperature sources at temperatures $T_{LOW}$ and $T_{HIGH}$ to the input of the radiometer. $T_{LOW}$ should be near or below the radiometer's internal temperature $T_{INT}$ but above the radiometer's minimum input temperature, and $T_{HIGH}$ should be near the radiometer's maximum input temperature, which is found by setting $V_C = V_{MAX}$ in the equation for $T_A$ above. The resulting output voltages $V_{LOW}$ and $V_{HIGH}$, respectively, can be used to solve for experimental values of m and b.

It should be noted that the embodiment of FIG. 1 substantially reduces the number and complexity of microwave components compared to prior noise-injection systems. Instead of a latching switchable circulator, this embodiment requires only a much less expensive passive circulator 16.

Instead of a temperature-controlled reference load, this embodiment uses an ordinary load 22, whose temperature is monitored. This embodiment of the present invention also eliminates the need for a second PIN switch used in prior systems to interrupt the noise diode output by switching the noise diode's power source directly. Finally, the invention uses a type of inexpensive, mass-produced LNB.

Second Embodiment

A system 110 reflecting a second embodiment 110 of the present invention is shown in FIG. 2. In system 110, a low loss antenna 112 receives the microwave power from the object (not shown) whose temperature is to be measured. A low-loss microwave switch 114 alternately allows the incoming microwave energy to pass on to the rest of the system 110 (the PASS mode) or blocks it and becomes a highly reflective circuit element (the BLOCK mode). In the PASS mode, the switch 114 permits the incoming microwave energy to pass through the circulator 116 into the LNB 120. In the PASS mode, LNB 120 filters and amplifies the incoming microwave power, converts it to a lower frequency and outputs the amplified and downconverted power to an internal IF amplifier. The amplified power output of the LNB is then detected by a microwave detector 124.

In the BLOCK mode, the switch 114 blocks the incoming power from the microwave source and reflects power from both an ambient load 122 and a noise-injection source 134 connected therein into the LNB 20.

The microwave switch is rapidly switched between the PASS mode and the BLOCK mode at a frequency $f_S$ generated by clock 126, thereby creating a square wave signal at the output of detector 124. This square wave is AC-coupled through a capacitor 128 to an audio-frequency amplifier 130 whose amplified signal is outputted to a synchronous detector 132. The detector 132 generates a DC output signal proportional to the difference between the noise powers amplified in the PASS mode and in the BLOCK mode.

The detector output voltage is inputted into a servo loop amplifier 36, the output of which is inputted into a V to DT converter 138. The converter 138 produces an output voltage whose duty cycle ratio is directly proportional to the input voltage $V_C$. This converter output drives the noise source 134 to cause the injection of additional noise power into the LNB 120 during the BLOCK mode.

Unless otherwise stated, the functions and characteristics of each of the components of the system 110 of the second embodiment is the same as for the corresponding components of the system 10 of the first embodiment, e.g. microwave switch 114 corresponds to microwave switch 14.

The primary difference between the system 10 in FIG. 1 and system 110 in FIG. 2 is that system 110 has no directional coupler. Instead, the noise power of the noise-injection source 134 is reduced by means of an attenuator 122, which doubles as the reference-temperature load when the system is in the PASS mode. In this second embodiment, operation of the system 110 in the PASS mode is identical to system 10 of FIG. 1. Instead of coupling injection power in through a directional coupler, noise in the system 10 is injected through the attenuator 122 and the circulator 116 to the LNB 120. Because of this more direct path, a lower level of injected noise power can be used than in system 10 in FIG. 1. The main advantage of system 110 over that of system 10 is that no directional coupler is needed.

Figure 3:
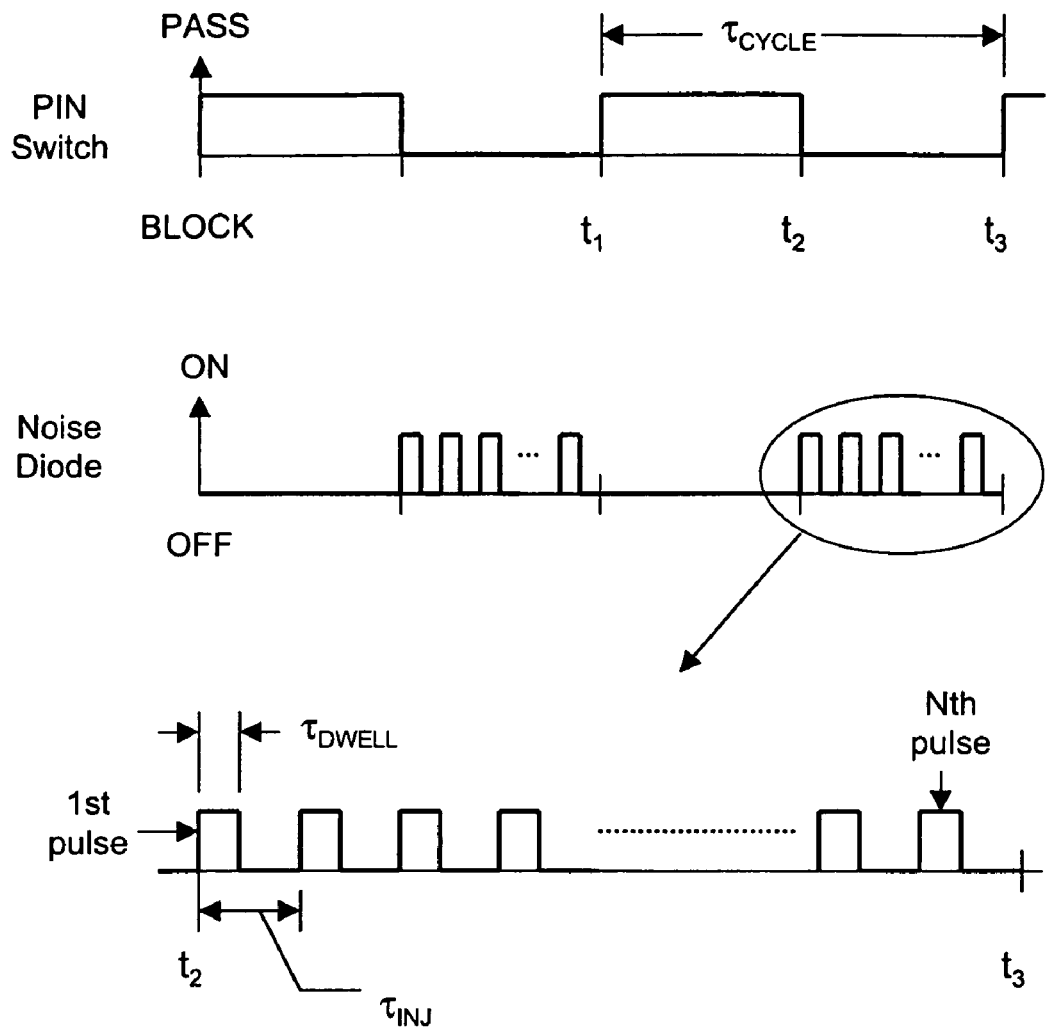
FIG. 3 is a timing diagram of the reference signals used in the first and second embodiments of the remote temperature measurement system.

FIG. 3 shows timing information for the system 110 control waveforms that switch the microwave switches 14 and 114 and the noise sources 34 and 134 in FIG. 1 and 2 respectively. In FIG. 3, during a period of length $\tau_{CYCLE}$, the systems 10 and 110 are in the PASS mode from time $t_1$ to time $t_2$. A portion of the clock circuits 26 and 126 inhibits the noise-injection sources 34 and 134, respectively, from operating during the PASS mode. At time $t_2$, the systems switch from the PASS mode to the BLOCK mode, and the noise-injection sources begin to operate. This operation is caused by a series of N pulses, each of which has an ON time of $\tau_{DWELL}$. The ratio $(\tau_{DWELL}/\tau_{INJ})$ equals A and is the duty cycle ratio of the pulses applied to the noise-injection sources. As explained above, the duty cycle is directly proportional to the control voltage $V_C$. The switching frequency $f_D$ of the signal to the noise-injection sources is such that N cycles of the noise source pulses fit exactly into the BLOCK time between $t_2$ and $t_3$. In the present embodiment, N=32, but other integers can be used. This integer relationship insures that there is no cycle-to-cycle "beat" effect that would add spurious noise to the output voltage.

Advantages of the First and Second Embodiments

While "total-power" radiometers use fewer expensive microwave components, experimental trials have shown that instabilities in amplifier gain and detector sensitivity make it very difficult to obtain a reliable and accurate relationship between a total-power radiometer's output voltage and the noise power available from the object under investigation. Other radiometer system approaches such as the Dicke-switch system reduce, but do not eliminate, effects of gain and detector changes upon the output voltage. The servo-loop, noise-injection radiometer system embodied in the present invention has the advantage that the linear relationship between the noise power input and the output voltage is established by the linearity of the voltage-to-dwell-time converter. Because the detector in a properly operating system of this type operates at a nearly constant output level, nonlinearities in the detector's sensitivity or fairly major changes in system gain have virtually no first order effect on the output voltage. This should eliminate any need to operate the radiometer in a controlled-temperature environment. Although its operation is influenced by the ambient temperature $T_{AMB}$ of the reference load 22 or attenuator 122 in FIGS. 1 and 2 respectively), this temperature can be measured and compensated for in the output circuit, with either a linear analog summing circuit or a digital signal-processing circuit.

The present embodiment uses analog circuitry in all parts of the systems 10 and 110 except for the clock and control circuits. In principle any or all functions of the systems beyond the microwave detectors 24 and 124 could be executed with digital signal processing (DSP) hardware and software instead of analog circuitry. Such alternate methods of approach do not affect the fundamental principles of operation which are described herein.

Third Embodiment

One of the circumstances in which it is difficult to measure temperature in industrial settings is when the material or object undergoing examination is being heated by electromagnetic fields. The frequency of these fields can vary from 50 Hz to the microwave range (2.45 GHz or higher). Regardless of frequency, the intensity of these fields can interfere with the operation of contacting temperature probes such as thermocouples, and can even disrupt operation of remote temperature sensing devices such as infrared sensors.

Figure 4:
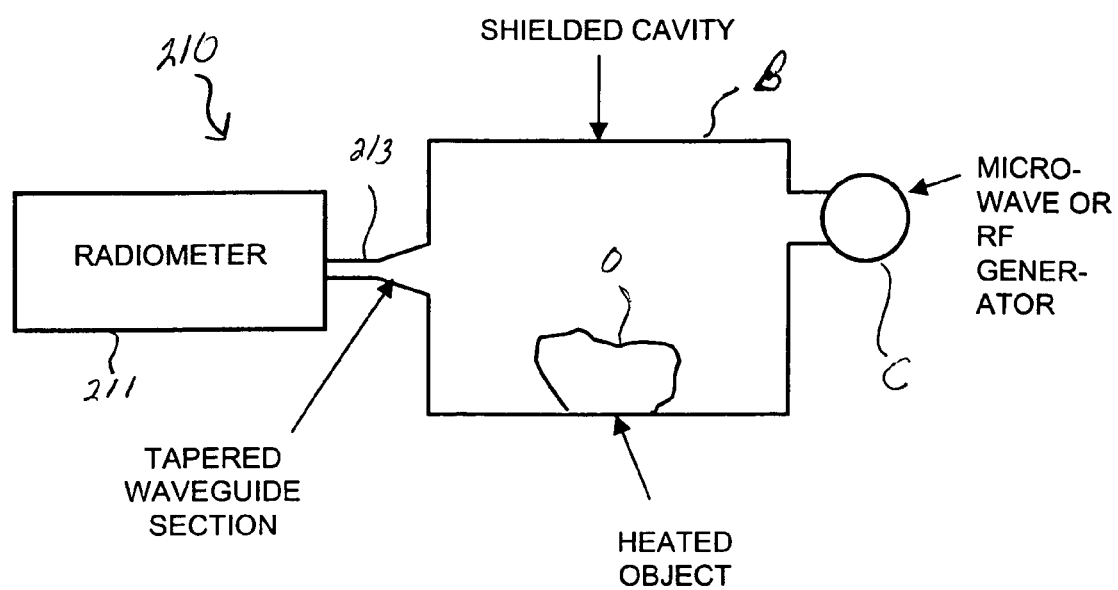
FIG. 4 is a block diagram of a third embodiment of the remote temperature measuring system adapted for measuring the temperature of an object within an electromagnetically shielded enclosure.

In FIG. 4, the systems of the prior embodiments may be adapted to create a third embodiment or system 210 of the present invention that measures the temperature of an object inside an electromagnetically shielded enclosure B (a microwave oven in this embodiment). Although the following discussion will be limited to the application of the system 210 for the measurement of temperature inside a microwave oven, other possible applications include the measurement of temperature of objects heated in other types of microwave heating systems and RF heating systems as well.

In a typical microwave oven, the object or material O to be heated is placed inside an enclosure or cavity whose walls are highly conductive metal. Any joints in the enclosure (such as around doors, etc.) are sealed or otherwise made impervious to microwave energy: When power from a high-power source C of microwave energy is coupled into the cavity, it creates a pattern of intense electric and magnetic fields. For most applications, the cavity is sized to be. "overmoded," which means that more than one electromagnetic mode pattern can be excited in or near the frequency range of operation. In this way, the electric field is made to penetrate into most regions of the material with as few "cold spots" as possible. In some systems, the overmoding is aided by a "mode stirrer," which is a movable conductive object that rotates during system operation and changes the mode patterns.

Because any lossy material (e. g. one with nonzero conductivity or one with a complex dielectric constant at the frequency of the incident microwave energy) will absorb energy and convert it to heat, the object is heated by the microwave power from the source. Since microwaves penetrate rather deeply into some materials, substantial internal heating as well as surface heating occurs. This internal heating results in internal temperature changes which cannot be sensed by infrared sensors, since infrared radiation originates within microns of the surface of most materials.

In addition to the shielded enclosure and microwave or RF power source shown in FIG. 4, we show a radiometer 211 and a tapered waveguide 213 leading to an opening in the enclosure. Suppose that for a short time, the electromagnetic heating process is briefly interrupted by momentarily reducing the generated microwave power to zero. The same type of electromagnetic coupling which allows materials or objects to be heated by microwave energy also produces thermal microwave radiation which can be measured by a microwave radiometer. Because the typical enclosure is overmoded and may use a mode stirrer, the thermal microwave energy available from an object O in such an enclosure originates from many parts of the object, including some points in the interior of the object. Therefore, the noise temperature of the microwave power emerging from the enclosure is close to an average temperature reading of the outer volume of the material.

This noise power is efficiently coupled to the radiometer 211 by means of a tapered waveguide section 213 resembling a horn antenna. Other coupling means may be used as long as the guided mode in the waveguide going to the radiometer 211 is strongly coupled to the electromagnetic energy in the enclosure. As long as the radiometer 211 operates at a microwave frequency that is considerably higher than the heating-power frequency, a short section of waveguide between the enclosure and the radiometer will operate as an effective high-pass filter. In the present embodiment, approximately 15 cm of 8.2–12.4 GHz waveguide provide over 100 dB of attenuation at 2.45 GHz, the frequency of the microwave oven magnetron output. This filtering action protects the radiometer from being damaged by high-power heating energy when the microwave power source is turned on.

During a brief interruption of the heating process, the radiometer 211 can measure the thermal noise power available from the object O. Through calibration or by other means, this power can be interpreted as an equivalent average object temperature. As long as the heated object is the most lossy object in the enclosure, the same principle that insures efficient heating of the object (rather than the walls, for example) insures that the radiometer measures primarily the temperature of the object.

Operation of Third Embodiment During Electromagnetic Heating Processes

Because the typical microwave power sources used for electromagnetic heating emit copious amounts of harmonics, it is not generally possible to employ microwave radiometry to estimate the temperature of objects while they are being subjected to microwave heating. For example, the noise power emitted from a typical 1-KW microwave magnetron operating at a fundamental frequency of 2.45 GHz is several milliwatts at 12 GHz, which is the frequency range we have found to be useful for microwave radiometry. Such noise power exceeds the thermal noise radiated by heated objects, making the latter impossible to measure. One possible way to avoid this problem is to install a high-power waveguide filter between the microwave power source and the chamber holding the material to be heated. This approach is impractical because a filter with the requisite power-handling capacity and rejection characteristics at the harmonic frequencies would be very bulky, expensive, and hard to adjust.

By exploiting a characteristic of the power supplies typically used in low- and medium-power microwave ovens, the system 210 can measure thermal microwave radiation from heated objects contemporaneously with microwave heating. In such microwave ovens or similar sources that use single-phase AC electric power, the power supply usually delivers pulsating, poorly-filtered DC to the magnetron in order to minimize stored energy in the power-supply circuit (this prolongs magnetron life). The result is that the power output. of the microwave source is modulated at the power-line frequency (60 Hz in the US) and has an approximately 50% duty cycle. Therefore, even at full power the microwave generator delivers power to the heating chamber only about 50% of the time. During the other half-cycle the generated power goes to zero, allowing operation of the microwave radiometer 211.

Figure 5:
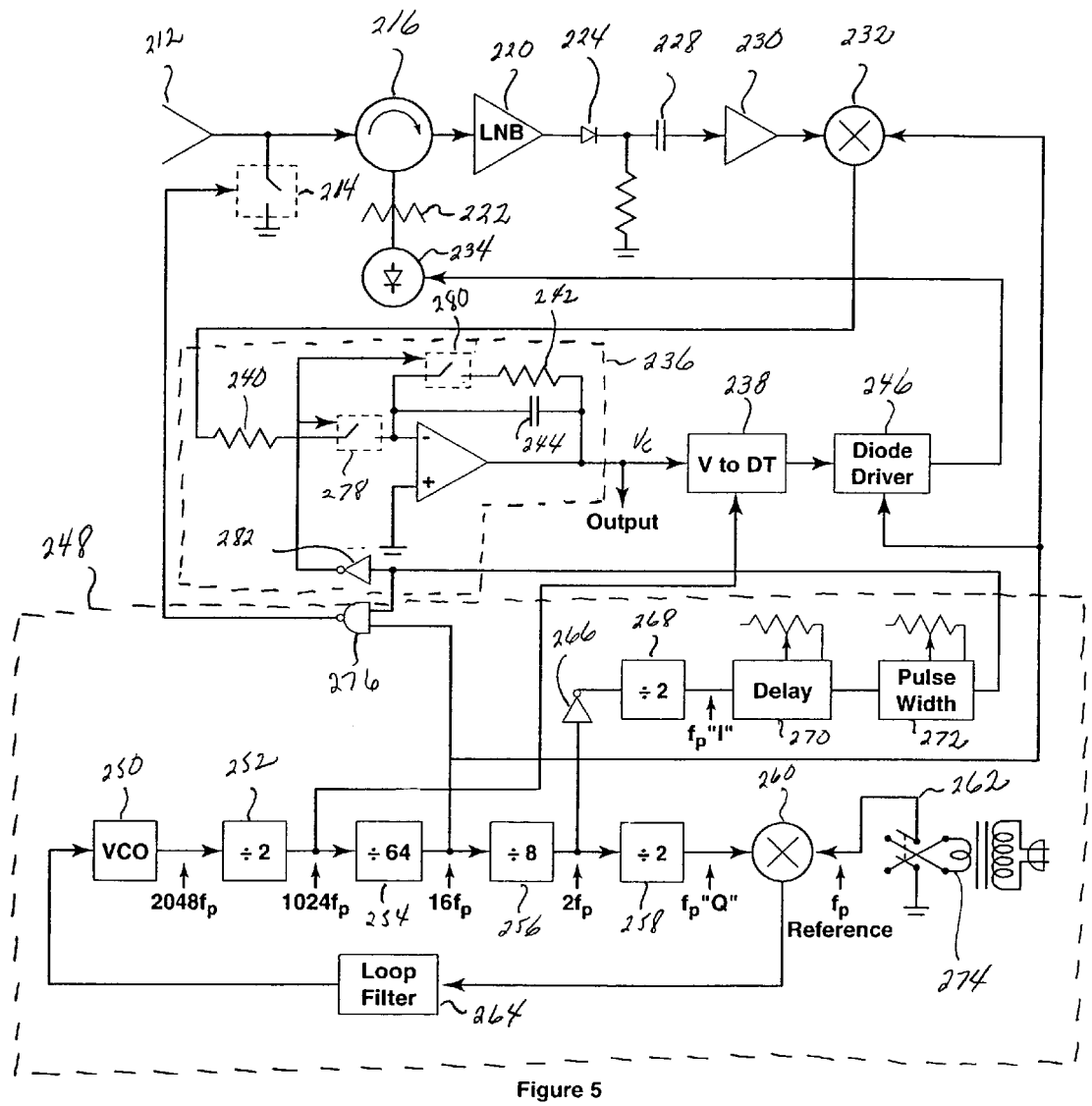
FIG. 5 is an expanded block diagram of a third embodiment of the remote temperature measuring system.

FIG. 5 is a expanded block diagram of the synchronous-mode version of the third embodiment of the radiometer system 210. As in the previous two embodiments, radiation sensed from the electromagnetically shielded enclosure enters the receiving port 212, is periodically blocked by a microwave switch 214, goes through a circulator 216 to an LNB 220, is detected by an RF detector 224. The output from the detector 224 is AC-coupled through a capacitor 228 to produce an audio-frequency AC waveform which is amplified by an audio-frequency amplifier 230, synchronously detected by detector 232, and fed to the input of the loop amplifier 236. In FIG. 5, the details of the loop amplifier 236 are shown, including the input resistor 240, feedback resistor 242 and capacitor 244. The loop amplifier output goes to a V to DT converter 238 whose variable-duty-cycle output drives a noise injection source driver 246. The output of the V to DT converter 238 is a rectangular wave of constant frequency and variable dwell time (or duty cycle-percentage of the period that the wave is high). The duty cycle is a linear function of the input voltage to the converter 238. In this way, the average noise power produced by the noise injection source 234 as measured by the RF detector 224 is made to be nearly equal to the amplified noise power produced by the source being measured. The control voltage input to the V to DT converter 238 is a direct measure of the equivalent input temperature to the radiometer 211, and forms the analog output voltage of the system 210.

System 210 includes a phase-locked loop circuit 248 that synchronizes the clock and all timing operations of the microwave radiometer to the power-line frequency of the power source C. During the period of the power-line cycle that the microwave power source is not operating, the radiometer operates normally. During the period of the cycle that the microwave power source emits power, the radiometer input is protected by setting the input microwave switch 214 to the "block" mode, and the loop amplifier of the radiometer's feedback loop is set to a "hold" condition. This hold condition preserves the integrated data stored in the loop amplifier's feedback capacitor and essentially freezes the loop operation for a limited time. At the end of the half-cycle of microwave power generation, the radiometer 211 returns to normal operation. Experiments have shown that this interrupted synchronous mode of operation does not measurably impair the normal operation of the radiometer.

The PLL 248 synchronizes the radiometer's operation to the power-line frequency $f_P$ operates as follows. A voltage-controlled oscillator (VCO) 250 produces an output at a frequency which is 2048 times the power-line frequency $f_P$. (In the U.S. where $f_P$=60 Hz, 2048$f_P$=122.88 kHz). A digital divide-by-two circuit 252 produces a frequency of 1024$f_P$ (61.44 kHz in the U.S.), and this frequency is used as the period of the variable-duty-cycle pulses which drive the noise diode. (All frequency division is accomplished by suitable digital circuits such as J-K flip-flops.) A further frequency division by 64 circuit 254 produces a frequency of 16$f_P$ (960 Hz in the U.S.). This frequency becomes the reference frequency used by the synchronous detector 232 to demodulate the AC radiometer detector output, and also operates the microwave switch 214 in synchronism. This frequency is also used at the noise-diode driver's blanking input to "blank" (turn off) the noise diode 234 during the times when the radiometer input signal is being measured. A further division of the frequency 16$f_P$ by 8 circuit 256 produces a frequency of 2$f_P$ (120 Hz in the U. S.). Direct division of this frequency by 2 circuit 258 produces a signal termed $f_P$ "Q" (quadrature) which drives one input of the PLL phase detector 260. The other phase-detector input comes from a transformer 262 which is connected to the local power line, on the same circuit and phase which provides power to the microwave oven or other electromagnetic heating device.

The output of the PLL phase detector 260 goes through the PLL loop filter 264 to control the frequency of the VCO 250. When the PLL 248 is in operation, it causes the signal $f_P$ "Q" to be exactly 90 degrees out of phase (phase quadrature) with the reference power-line signal. Any noise spikes or other short-term transients on the power line are filtered out by the loop filter 264, which is designed so that the PLL's natural frequency is on the order of 1 Hz. This produces a high degree of power-line noise immunity which would not be available if the system 210 were synchronized by other means, e.g., a zero-crossing detector operated from the power line.

To produce a signal in phase with the power-line reference, an inverter 266 operated from 2$f_P$ drives a second divide-by-two circuit 268. With all dividers triggered by the same edge (positive or negative), this circuit 268 produces a second signal $f_P$ "I" in phase with the 60-Hz reference signal. Because of variations in transformer and power-supply characteristics, the phasing of the electromagnetic power generator's output may lie anywhere along the 360 degrees represented by a cycle of the power-line waveform. To allow for this, the embodiment follows the second divide-by-two circuit 268 with an adjustable time delay circuit 270 and an adjustable pulse-width circuit 272. Also, provision is made for reversing the phase of the $f_P$ reference signal with a 180-degree phase-reversing switch 274. Proper adjustment of these controls for any particular case produces an output pulse which is on only when the electromagnetic generator is off.

Figure 6:
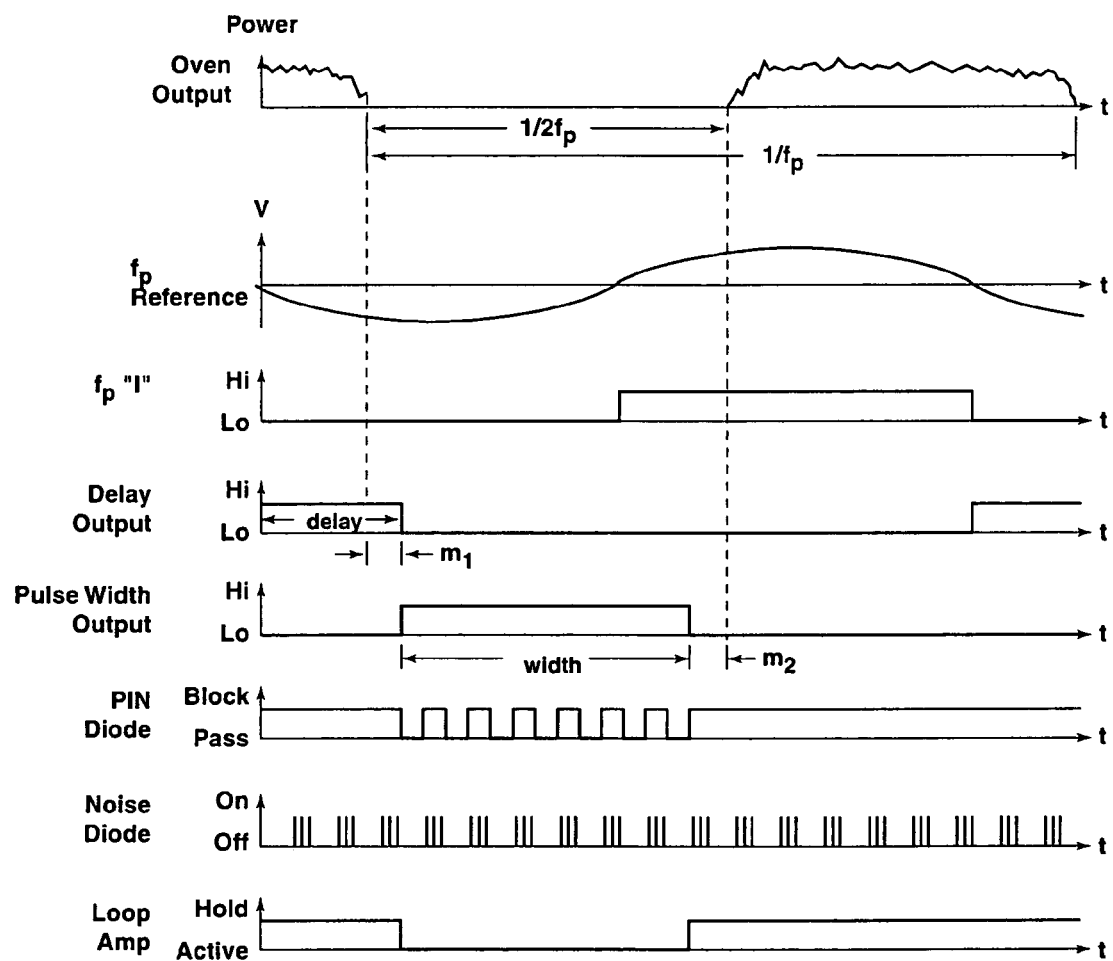
FIG. 6 is a timing diagram of the reference signals used in the third embodiment of the remote temperature measuring system.

FIG. 6 illustrates the timing relationships in this embodiment. The power output of the electromagnetic generator used in the oven is shown as irregular pulses with a period 1/($f_P$). In general, the available power-line voltage will have an arbitrary phase relationship to the electromagnetic generator output. The negative-going edge of the PLL output signal $f_P$ "I" triggers the delay circuit (270 in FIG. 5), which produces a pulse of variable length $\tau_{DELAY}$. This length is adjusted so that radiometer operation will not commence until a safety margin time of length $m_1$ has passed after the electromagnetic generator ceases operation. Upon the negative-going edge of the delay circuit output, the pulse-width circuit (272 in FIG. 5 is triggered and produces a pulse of length $\tau_{WIDTH}$. The length of this pulse is adjusted so that a second safety margin time $m_2$ occurs between the time the radiometer ceases operation and the time the electromagnetic generator begins operation again. While analog timing circuits are used for these functions in the present embodiment, digital hardware and/or software can be substituted for many of the functions presently performed by analog hardware without changing the essential functioning of the overall system.

To protect the radiometer's RF hardware from the high-power microwave energy in the oven, a length of WR-90 waveguide (0.9 inches wide by 0.4 inches high in rectangular cross section) approximately six inches long is interposed between the microwave oven cavity and the input to the microwave switch 214. At 2.45 GHz, this length of waveguide is in cutoff and provides attenuation of approximately 100 dB. The above-mentioned harmonics of 2.45 GHz are not attenuated, but are at a much lower level (on the order of milliwatts) than the 2.45-GHz fundamental frequency. To prevent overloading of the LNB 220, the microwave switch 214 is set to the "BLOCK" mode as shown in FIG. 6 during the period of time when the electromagnetic generator is operating. During the period $\tau_{WIDTH}$ the microwave switch 214 operates in the switching mode as described above in connection with normal radiometer operation. The NAND gate 276 in FIG. 5 produces the signal needed to drive the switch 214 in this way. Since no harm is caused by allowing the noise injection source 234 to operate during the entire power-line cycle, it may be allowed to do so.

The detailed operation of the loop amplifier circuit is as follows. Referring to FIG. 5, the loop amplifier 236 differs from previously described embodiments in that in addition to the input resistor 240, the feedback resistor 242, and integrating capacitor 244, two electronically controlled normally-on FET switches 278 and 280 are inserted into the circuit as shown. During the period of time $\tau_{WIDTH}$, the two FET switches are closed and the loop amplifier 236 operates normally. Normal operation consists in the loop amplifier 236 acting as an integrator with a low-frequency gain limited by the feedback resistor 242. The capacitor 244 integrates (or filters) the raw synchronously-detected input signal so as to produce a closed-loop gain of approximately 20 dB and a closed-loop bandwidth on the order of 50 Hz. This bandwidth is sufficient to reduce the 960-Hz synchronous switching frequency to a low enough value so as not to seriously corrupt the temperature data.

When the time approaches that the electromagnetic generator turns on, the pulse at of width $\tau_{WIDTH}$ at the output of the pulse-width circuit 272 goes LO. This pulse is inverted by a digital inverter circuit 282 to drive the FET switches so that when the original pulse goes LO, the FET switches are activated and turn off (open). The two switches are so situated as to isolate the loop amplifier's input from all DC paths, leaving it connected only to the integrating capacitor 244. This situation forms a type of analog memory circuit which preserves the static charge on the capacitor for the few milliseconds that the electromagnetic generator is operating. At the end of that period, the FET switches 278 and 280 close. Because thermal data has a very small bandwidth, the temperature signal level after this delay is virtually identical to the level at the beginning of the delay, so the opening and closing of the FET switches introduces virtually no noise or error voltage into the signal. The radiometer output is thus valid during the entire power-line cycle and can be sampled at any time by suitable data transmission and logging equipment.

The system 210 described immediately above allows real-time monitoring of temperature inside a microwave oven or other electromagnetic heating system during normal operation. Such measurements are presently obtainable only with expensive fiber-optical temperature probes which are intended primarily for laboratory use, or with infrared probes which can only monitor apparent surface temperature. Many applications in both industrial and commercial settings will be made possible by this system.

Fourth Embodiment

The three preceding embodiments of the invention will produce accurate, usable temperature data. However, the manner in which the noise-injection system works in the first three embodiments imposes a limitation upon the accurately measurable input temperature range of the systems. Consider the first embodiment illustrated in FIG. 1, with the corresponding control waveforms illustrated in FIG. 3. While the effective amount of noise power injected into the LNB 20 varies linearly with the dwell time ratio $\tau_{DWELL}/\tau_{INJ}$ as this ratio varies from slightly greater than 0 (0%) to slightly less than 1.0 (100%), finite risetimes and other limitations cause this functional dependence to be nonlinear at very low and very high values of the dwell-time ratio near 0% and 100%, respectively. This means that the linear input range of the instruments in the first three embodiments are limited to a temperature range $T_{MIN}$ to $T_{MAX}$, where $T_{MIN}$ is inevitably somewhat higher than $T_{AMB}$, the ambient temperature of the systems. The reason for this is that when the system's input temperature $T_A$ at the antenna is equal to the system's ambient temperature $T_{AMB}$, no additional injected noise is required to produce a balanced condition. Therefore, the system's minimum measureable temperature $T_{MIN}$ must be greater than the system's internal ambient temperature $T_{AMB}$. If for environmental or other reasons, $T_{AMB}$ is higher than the temperature $T_A$ to be measured, this situation further restricts the useful input temperature range since for the first three embodiments, the inequality $T_A > T_{MIN}$ must be satisfied. Any attempt to shift the system's input temperature range by adding a DC offset voltage to the synchronous detector output, for example, will introduce a gain-dependent term which can cause unacceptable output drift.

A fourth embodiment of the present invention addresses this problem by increasing the input temperature range so that input temperatures below the instrument ambient temperature $T_{AMB}$ can be measured with good linearity and stability. This embodiment will be described with the aid of FIGS. 7 and 8.

Figure 7:
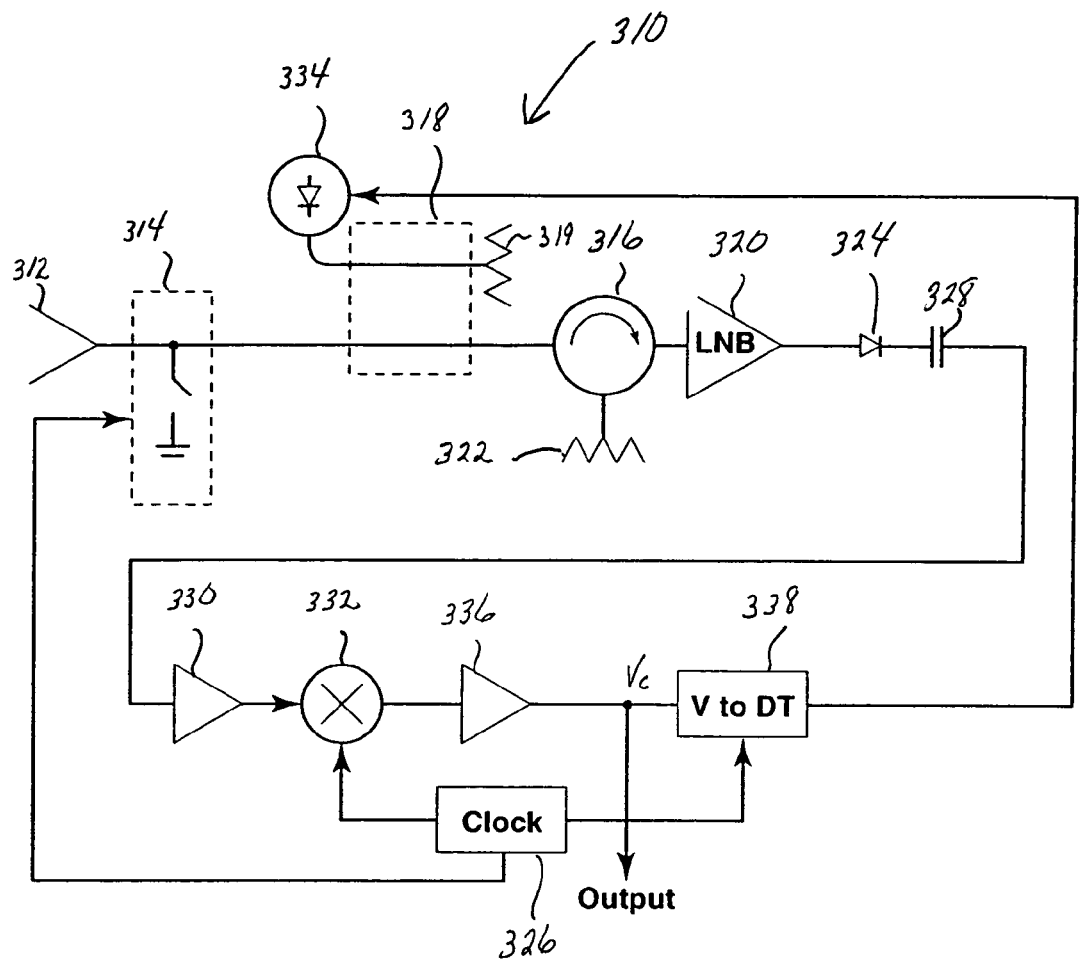
FIG. 7 is a block diagram of a fourth embodiment of the remote temperature measuring system.

FIG. 7 shows the system 310. It differs from system 10 of FIG. 1 only in the relative positions of the circulator and load (316 and 322 in FIGS. 7; 16 and 22 in FIG. 1) and the directional coupler (318 in FIGS. 7, 18 in FIG. 1), noise injection source (334 in FIGS. 7, 34 in FIG. 1), and directional coupler load (319 in FIGS. 7, 19 in FIG. 1). In practice, the position of the circulator and load in FIG. 1 and in FIG. 7 works approximately equally well, and either configuration can be used for embodiments one, three, and four.

Figure 8:
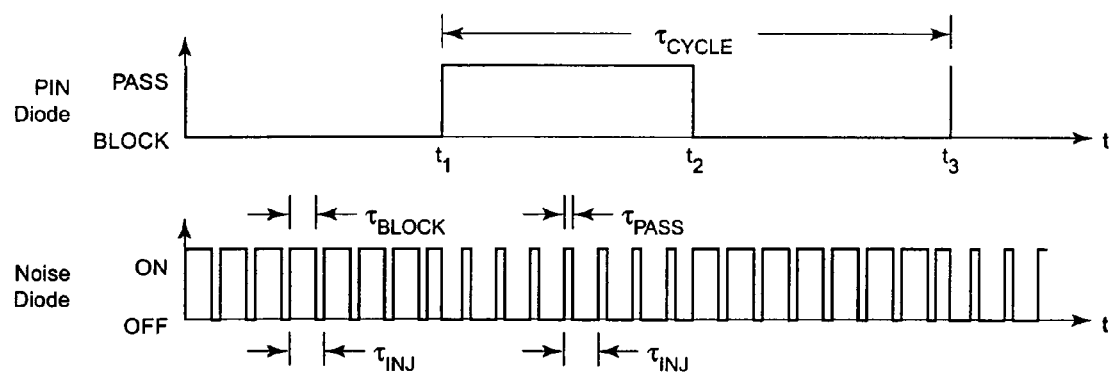
FIG. 8 is a timing diagram of the additional feedback signal to the noise-injection source used in the fourth embodiment of the remote temperature measuring system.

FIG. 8 shows the different control waveforms used which chiefly distinguish the fourth embodiment from the previous three embodiments. As in the first three embodiments, the PIN switch or other microwave switch 314 alternates between a PASS mode (as between times $t_1$ and $t_2$ in FIG. 8) and a BLOCK mode (as between times $t_2$ and $t_3$ in FIG. 8). The difference between the first three embodiments and the fourth embodiment lies in the nature of the noise injection source (noise diode) drive waveforms. In the signal waveform diagrams of the first three embodiments as illustrated in FIGS. 3 and 6, when the microwave switch is in the PASS mode, the only noise input to the LNB is the thermal noise from the system's target source, represented by input temperature $T_A$. In the fourth embodiment's waveforms illustrated in FIG. 8, during the PASS mode the control electronics sends a signal to the noise diode with a constant, fixed dwell time ratio $\tau_{PASS}/\tau_{INJ}$ equals $A_O$. In the fourth embodiment, this fixed dwell time ratio $\tau_{PASS}/\tau_{INJ}$ was set to be 0.25, but other values between 0 and 1 (0% and 100%) can be used. The effect of this injection of additional noise power during the PASS mode is to raise the effective input temperature to the LNB above ambient temperature during the PASS mode, even when the target temperature at the system's input is equal to or less than $T_{AMB}$.

Other than the change described in the preceding paragraph, the same servo loop configuration is used in the fourth embodiment as in the first-three embodiments. In the fourth embodiment, for the servo loop to achieve balance, when the system input temperature equals $T_{AMB}$, the dwell time ratio $\tau_{BLOCK}/\tau_{INJ}$ during the BLOCK mode must equal the dwell time ratio $\tau_{Pass}/\tau_{INJ}$, which is set at a value greater than 0, 0.25 or 25% for example. Even if the system's input temperature $T_A$ varies slightly below the system's internal ambient temperature $T_{AMB}$, the dwell time ratio $\tau_{BLOCK}/\tau_{INJ}$ during the BLOCK mode will still remain substantially above 0, thus avoiding the nonlinearities and ultimately the lower range limit imposed when $\tau_{BLOCK}/\tau_{INJ}$ approaches zero. With the changes described in the fourth embodiment, no DC offset with its consequent drift problem is needed.

While the injection of noise during the PASS mode results in a slightly reduced sensitivity (increased standard deviation of the system's output for a given input temperature $T_A$), this increase is small and of little consequence when hot noise sources are being measured. The upper noise temperature limit $T_{MAX}$ of the system can be extended almost arbitrarily with the use of more powerful noise sources and tighter coupling (less loss) between the noise diode or other noise injection source and the LNB. In the disclosed embodiments, noise diodes with effective noise temperatures varying from 1600 K up to 40,000 K may be used. Since physical temperatures exceeding 10,000 K are rarely encountered in industrial practice, the fourth embodiment of the instrument is capable of being designed to measure virtually any physical temperature encountered in industrial heating processes.

The offset technique described in the fourth embodiment can be straightforwardly applied to the synchronous-mode system 210 of the third embodiment, thus making system 210 capable of measuring temperatures from below $T_{AMB}$ up to very high values with very low drift as well.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A system for remotely measuring the temperature of an object using microwave radiometry, comprising:
    antenna for receiving microwave power radiated from the object;
    switch means connected to the antenna and operable in a PASS mode and a BLOCK mode,
    means for switching the microwave switch means between the PASS mode and BLOCK mode at a specified system switch frequency;
    ambient temperature load that generates noise power reflective of the ambient temperature;
    means for amplifying the microwave power it receives;
    wherein, in the PASS mode, the microwave switch passes the object power to the amplification means for amplification and, in the BLOCK mode, the switch means blocks the object power to the amplification means and reflects the load noise power to the amplification means;
    injection means for injecting additional noise power into the amplifier means during the Block mode;
    detector means for detecting the output power of the amplification means;
    means for generating an output signal proportional to the difference between the noise powers detected and measured in the PASS mode and in the BLOCK mode;
    loop means for generating a feedback signal to the injection means, the feedback signal having a duty cycle proportional to the output signal to cause the injection means to inject sufficient noise power into the amplification means during the BLOCK mode to automatically maintain a balance between the noise power measured in the PASS MODE and the combination of noise powers measured in the BLOCK mode; and
    means for computing the temperature of the source from the output signal.

2. A system for remotely measuring the temperature of an object using microwave radiometry, comprising:
    a low-loss antenna for receiving microwave power at an input temperature $T^A$ radiated from the object;
    a low-loss microwave switch connected to the antenna and operable in a PASS mode and a BLOCK mode;
    a clock for switching the microwave switch between the PASS mode and BLOCK mode at a specified frequency;
    an ambient temperature load that generates noise power reflective of the ambient temperature;
    a low-noise block converter for amplifying the power it receives;
        wherein in the PASS mode, the microwave switch passes the power received from the object to the block converter for amplification and, in the BLOCK mode, the microwave switch blocks the object power to the block converter and reflects the load noise power to the block converter;
    a noise injection source for injecting additional noise power into the block converter during the BLOCK mode;
    a microwave detector for detecting the output power of the block converter during the PASS and BLOCK modes and generating a signal in response thereto;
    a synchronous detector for generating an output signal proportional to the difference between the noise powers detected in the PASS mode and in the BLOCK mode; and
    a servo loop for generating a feedback signal to the noise injection source to cause the noise-injection source to inject sufficient power into the block converter during the BLOCK mode to automatically maintain a balance between the noise power measured in the PASS mode and the combination of noise powers measured in the BLOCK mode; and
    means for computing the temperature of the object from the output signal.

3. The system of claim 2, wherein the servo loop feedback signal has a duty cycle proportional to the output signal.

4. The system of claim 2, wherein:
    the load is an attenuator;
    the noise-injection source is connected to the attenuator in the BLOCK mode;
    the noise power from the injection source is injected through the attenuator and the circulator into the block converter, whereby the attenuator serves dual functions by reducing the components needed for the system and increasing the efficiency of the system.

5. The system of claim 2, wherein:
    the microwave switch comprises a single role reflective PIN-diode switch.

6. The system of claim 2, wherein:
    the noise-injection source comprises a noise diode.

7. The system of claim 2, wherein the signal coupled from the microwave detector is an AC signal whose amplitude is a measure of the difference between the noise powers detected in the PASS mode and in the BLOCK mode and the system further comprises:
    an audio amplifier for amplifying the AC signal wherein the synchronous detector converts the amplified AC signal into a DC signal proportional to the difference between the noise powers detected and measured in the PASS mode and in the BLOCK mode; and a loop amplifier for amplifying the DC signal while filtering any high frequency components of the DC signal to generate an output signal for computing the temperature of the object.

8. The system of claim 2, further comprising a directional coupler having a main arm connecting the microwave switch to the block converter and a secondary arm connecting the noise-injection source to the block converter; wherein the servo loop generates and transmits another signal to the injection source during the PASS mode that has a fixed duty cycle to cause the noise-injection source to inject sufficient power through the directional coupler into the block converter during the PASS mode to raise the effective input temperature of the power being received by the block converter to above the ambient temperature during the PASS mode.

9. The system of claim 2, further comprising: a circulator having one port therein connected to the output of the microwave switch, another port connected to the load, and a third port connected to the block converter and wherein in the PASS mode, the microwave switch passes the power received from the object through the circulator to the block converter for amplification and, in the BLOCK mode, the microwave switch blocks the object power to the block converter and reflects the load noise power through the circulator to the block converter.

10. The system of claim 9, further comprising:
a directional coupler having a main arm connecting the circulator to the block converter and a secondary arm connecting the noise-injection source to the block converter; wherein, during the PASS mode, the microwave switch passes the object power through the circulator and an arm of the directional coupler to the block converter and, in the BLOCK mode, the noise power of the load passes through the circulator and an arm of the coupler to the block converter and the noise power from the noise-injection source passes through another arm of the coupler to the block converter whereby the block converter amplifies a combination of the load power and the injected power during the BLOCK mode.

11. A method for measuring the temperature of an object of microwave radiation, comprising:
receiving microwave power radiated from the object;
coupling the received object power to a low-noise block converter in a PASS mode;
amplifying and detecting the microwave power received from the object during the PASS mode;
switching to the BLOCK mode using a single pole-single throw type reflective switch;
blocking the transmission of the power radiated from the object to the block converter and coupling noise power radiated from an load reflective of the ambient temperature and noise power injected from a noise injection source to the block converter during the BLOCK mode;
amplifying and detecting the combination of noise powers from the load and noise diode during the BLOCK mode;
continue alternately switching between the PASS mode and BLOCK mode at a system switch frequency to generate and detect an amplified signal wherein the amplitude of the signal is a measure of the difference between the noise power in the PASS mode and the combined noise powers measured in the BLOCK mode;
generating an output signal proportional to the difference between the noise powers detected in the PASS mode and in the BLOCK mode;
generating a feedback signal to the noise injection source proportional to the output signal to cause the noise diode to inject sufficient average noise power into the block converter to automatically maintain a balance between the noise power measured in the PASS mode and the combination of noise powers measured in the BLOCK mode; and
computing the temperature of the object from the output signal.

12. The method of claim 11, wherein:
the amplitude of the amplified signal generated by the step of continually switching is a measure of the difference between the noise power from the object in the PASS mode and the combined noise powers measured in the BLOCK mode.

13. The method of claim 12, including the step of generating and transmitting another signal to the injection source during the PASS mode that has a fixed duty cycle to cause the noise injection source to inject sufficient additional power into the block converter during the PASS mode to raise the effective input temperature of the power being received by the block converter to above the ambient temperature during the PASS mode.

\* \* \* \* \*